United States Patent [19]

Jack

[11] Patent Number: 5,849,199

[45] Date of Patent: Dec. 15, 1998

[54] SYSTEM FOR REGULATING THE COMPOSITION OF SWIMMING POOL WATER AND METHODS FOR PROVIDING THE SAME

[76] Inventor: Richard J. Jack, 2 Ableman Ave., Albany, N.Y. 12203

[21] Appl. No.: 669,877

[22] Filed: Jun. 21, 1996

[51] Int. Cl.⁶ .................................................. C02F 1/50
[52] U.S. Cl. ........................ 210/741; 210/97; 210/143; 210/169; 210/765
[58] Field of Search .................................. 210/169, 741, 210/97, 143, 765

[56] References Cited

U.S. PATENT DOCUMENTS

| | | | |
|---|---|---|---|
| 4,256,552 | 3/1981 | Sweeney | 210/169 |
| 4,260,587 | 4/1981 | Braden | 210/169 |
| 4,334,968 | 6/1982 | Sweeney | 210/169 |
| 4,381,240 | 4/1983 | Russell | 210/765 |
| 4,505,643 | 3/1985 | Millis et al. | 210/138 |
| 4,676,914 | 6/1987 | Mills et al. | 210/169 |
| 4,767,511 | 8/1988 | Aragon | 210/765 |
| 5,422,014 | 6/1995 | Allen et al. | 210/743 |

*Primary Examiner*—Neil McCarthy
*Attorney, Agent, or Firm*—Heslin & Rothenberg, P.C.

[57] ABSTRACT

The invention addresses the problem of preventing a buildup of water conditioning chemicals in a swimming pool water circulation system in the event of a circulation system failure. The invention involves providing a control for the chemical regulation system which is responsive to the water pressure in the circulation system and determinative of the output of the chemical pumps of the chemical regulation system as a function of the pressure of water in the circulation system. The chemical injection pumps may be disabled when circulation pressure falls below a predetermined threshold, whether caused by power failure, mechanical pump failure, or obstruction of the intake pipe. Related apparatus, systems and methods are disclosed.

7 Claims, 3 Drawing Sheets

SYSTEM FOR REGULATING THE COMPOSITION OF SWIMMING POOL WATER AND METHODS FOR PROVIDING THE SAME

FIELD OF THE INVENTION

The field of the invention is systems for regulating the composition of swimming pool water. The invention addresses the problem of preventing a buildup of water conditioning chemicals in a swimming pool water circulation system in the event of a circulation system failure.

BACKGROUND OF THE INVENTION

Swimming pools and other recreational water vessels such as diving pools, spas, hot tubs and the like (collectively referred to hereinafter as "pools" or "swimming pools") are typically provided with circulation systems which regulate water composition by removing impurities from the water, sanitizing the water, and balancing the pH of the water. FIG. 1 provides a functional illustration of a typical prior art swimming pool circulation system. In such systems, water is pumped by a main circulation pump 4 from a pool through one or more intake lines 2. The intake lines may lead from drains, surface skimmers, or vacuum tubes associated with the pool. The main circulation pump 4 forces the water through one or more filters 6 which remove particulate matter from the water. Typical pool filters use sand, diatomaceous earth, or paper cartridges as a filtering medium. Filtered water is returned to the pool through a return line 14.

The typical prior art circulation system further includes a chemical regulation system 9. The chemical regulation system typically comprises chemical pumps 8 which inject water conditioning chemicals into the circulation system from supply tanks 10. Typical water conditioning chemicals include sanitizing fluids such as sodium hypochlorite and pH balancing fluids such as muriatic acid. Periodic injections of predetermined amounts of these chemicals are typically at a rate which may be manually adjusted to match an observed depletion rate. Typically no independent control system is provided to regulate the operation of the chemical pumps. However, it is known in the art to provide a control system for the chemical pumps which employs chemical sensors to enable and disable the chemical pumps. Such systems have employed mechanical flow sensing elements for powering down the chemical sensing control system when the main circulation pump is shut off. However such systems are known to be prone to failure and probably account for less than one half of one percent of all presently used chemical injection systems in commercially operated pools in the United States.

While the chemical pumps of a typical swimming pool water circulation system may be powered from a power source which is regulated separately from that powering the main circulation pump, this has been found to be undesirable because a power failure affecting the main circulation pump may not affect the operation of the chemical pumps. In such instances the injection of chemicals into the circulation system will continue, producing a dangerous buildup of chemicals which will be discharged into the pool upon restarting the main circulation pump. Only one manner of addressing this problem is presently known in the field. As shown in FIG. 1, the problem is addressed by powering the main circulation pump 4 and the chemical pumps 8 from a common power source 12 such that a failure of common power source 12 will disable both the main circulation pump and the chemical pumps.

SUMMARY OF THE INVENTION

It has been determined by the applicant that other modes of circulation system failure may occur which present the possibility of dangerous chemical buildup in the circulation system and which are not avoided by simply powering both the main pump and the chemical pumps from a single power source. For example, a mechanical failure of the main pump impeller or a blockage of the circulation system intake will curtail water circulation and allow chemical buildup to occur. While such failures have long been a common problem in the field, the field contains no apparatus or teaching for reliably addressing the problem.

The present invention provides a solution to this problem which has been heretofore unknown in the field. Generally stated, the invention involves providing a control for the chemical regulation system which is responsive to the water pressure in the circulation system and determinative of the output of the chemical pumps of the chemical regulation system as a function of the pressure of water in the circulation system. Chemical injection pumps of the chemical regulation system may thus be disabled when circulation pressure falls below a predetermined threshold, whether caused by power failure, mechanical pump failure, or obstruction of the intake pipe.

Accordingly, the invention may be embodied in a swimming pool circulation system. A circulation system in accordance with the invention includes a filter, a pump, and intake and return lines. The system further includes one or more chemical pumps for injecting chemicals into the water, and a controller responsive to the pressure in the circulation system and determinative of the output of the chemical pumps as a function of the pressure of water in the circulation system.

The invention may further be embodied in a control module for a chemical regulation system of a swimming pool water circulation system. A control module in accordance with the invention includes a housing containing a controller which may be coupled to a circulation system and to a chemical pump. The controller is responsive to the pressure of water in the circulation system and is determinative of the output of the chemical pumps as a function of the pressure of water in the circulation system.

The invention may further be embodied in a method for providing a control system for a chemical regulation system of a swimming pool water circulation system. In accordance with the invention, the method involves providing a controller which is coupleable to the circulation system so as to be responsive to the pressure of water in the circulation system, and which is also coupleable to a chemical pump of the chemical regulation system so as to be determinative of the rate of output of the chemical pump as a function of the pressure of water in the circulation system. The controller is then coupled to the circulation system such that the controller will be responsive to the pressure of water in the circulation system when the controller is in an operative state, and coupled to the chemical pump such that the controller is determinative of the rate of output of the chemical pump as a function of the pressure of water in the circulation system when the controller is in an operative state.

The invention may further be embodied in a method for providing a system for regulating the composition of swimming pool water. In accordance with the invention, the method involves assembling a pump, a filter, an intake line and a return line so as to provide a circulation system for drawing water from a swimming pool, filtering the water, and returning the water to the swimming pool. A chemical pump is then coupled to the circulation system such that the chemical pump will be capable of pumping a chemical into the circulation system when the pump is in an operative state. A controller is provided which is coupleable to the circulation system so as to be responsive to the pressure of water in the circulation system. The controller is also coupleable to the chemical pump so as to be determinative of the rate of output of the chemical pump as a function of the pressure of water in the circulation system. The controller is then coupled to the circulation system such that the controller will be responsive to the pressure of water in the circulation system when the controller is in an operative state, and to the chemical pump such that the controller is determinative of the rate of output of the chemical pump as a function of the pressure of water in the circulation system when the controller is in an operative state.

The invention may be further embodied in a method for operating a chemical regulation system of a swimming pool water circulation system. In accordance with the invention, the method comprises determining that the pressure of water in the circulation system of a swimming pool is below a predetermined threshold, and preventing the injection of a water conditioning chemical into the water of the swimming pool.

DESCRIPTION OF THE DRAWINGS

The objects, advantages and features of the invention will be more readily understood from the following detailed description of certain preferred embodiments of the invention, when considered in conjunction with the accompanying drawings in which.

DETAILED DESCRIPTION OF THE INVENTION

Figure 1:
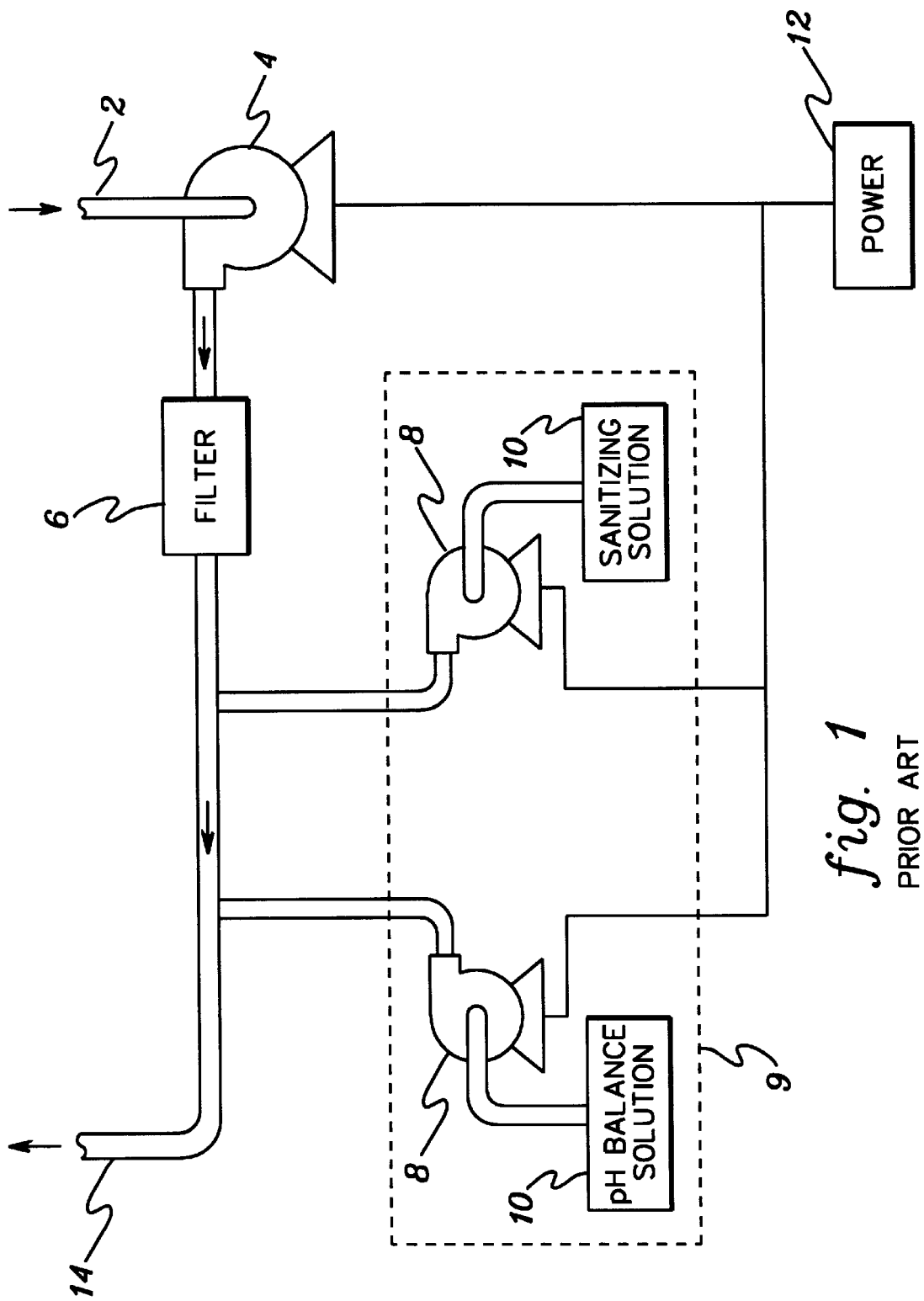
FIG. 1 depicts a functional diagram of a typical prior art swimming pool water circulation system.
Figure 2:
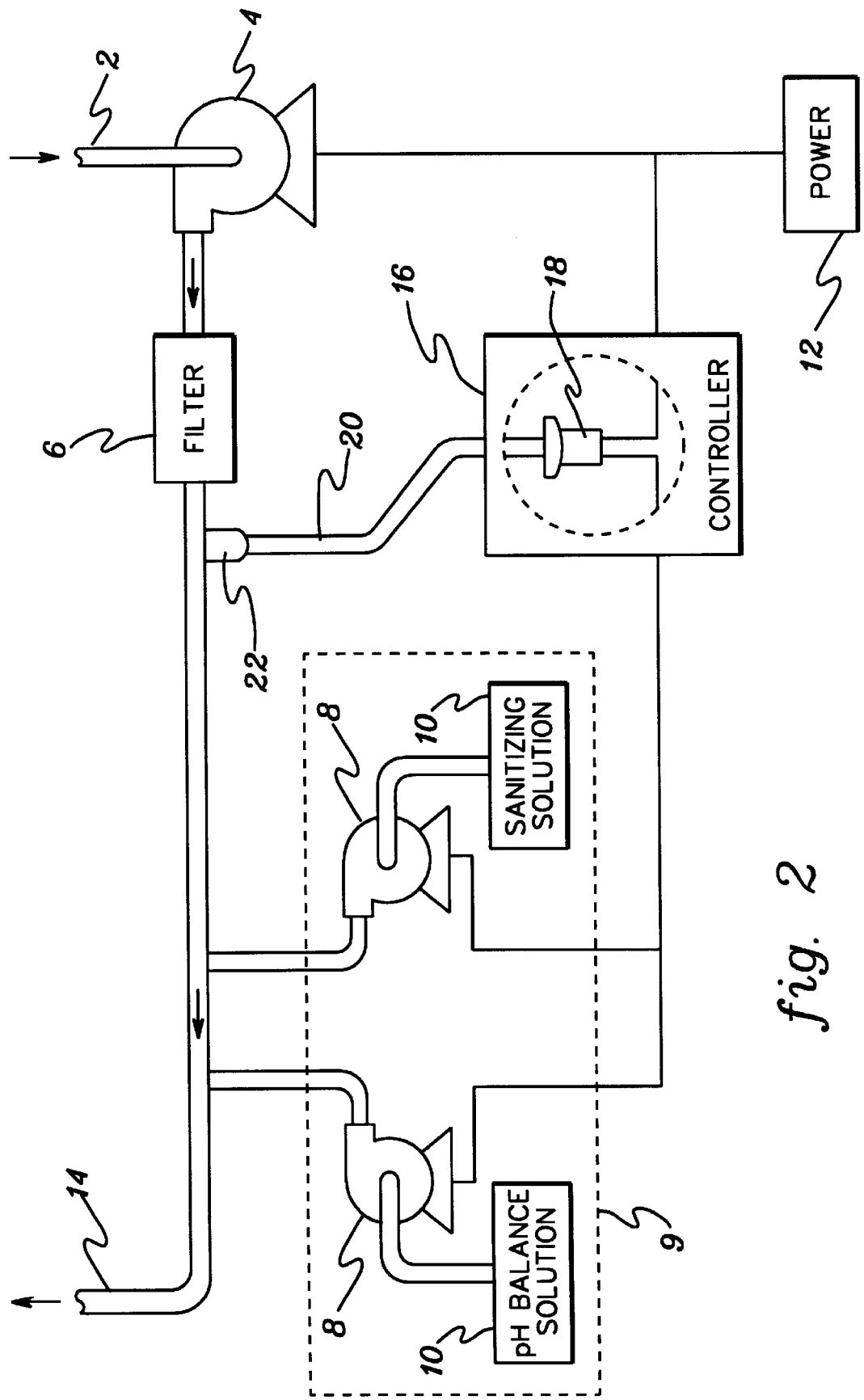
FIG. 2 depicts a functional diagram of a swimming pool water circulation system in accordance with the invention.

FIG. 2 provides a functional diagram of a swimming pool water circulation system in accordance with the invention. In this embodiment a controller 16 controls the operation of the chemical regulation system 9 as a function of the pressure of water in the circulation system. The controller 16 may operate to control the supply of power to the chemical injection pumps from a power source 12 such as a standard 110 volt ac ground faulted power source. The controller 16 may comprise a pressure responsive switch 18 which is coupleable to a source of fluid pressure. While a number of pressure responsive switches are available which may be adapted for this application, it is preferable to use a switch which is designed to resist the corrosive action which is typical of swimming pool water. Diaphragm-type pressure responsive switches fitting this criterion may be obtained from the Hayward Company of Nashville, Tenn.

The controller 16 may be coupled to the circulation system by a coupling means 20 such as a vinyl tube. The coupling means 20 is preferably coupled to the return line 14 of the circulation system at a point upstream from the injection points of the chemical pumps 8. The coupling means may include a standard fitting 22 which may be used to establish fluid communication with the return line 14 of the circulation system, for example by drilling a hole in the return line and threading in the fitting.

The controller may be configured to disable the supply of power to the chemical pumps whenever the pressure conveyed through the coupling means falls below a predetermined threshold. Typical swimming pool circulation systems maintain an internal pressure of 5 to 30 psi. Consequently it has been found satisfactory to use a controller which disables the operation of the chemical pumps when circulation system pressure falls below 5 psi, e.g. at a threshold of 2 psi. Pressure responsive switches such as the Hayward switch described above may be include a rotating wheel for calibrating the switching pressure of the switch.

Figure 3:
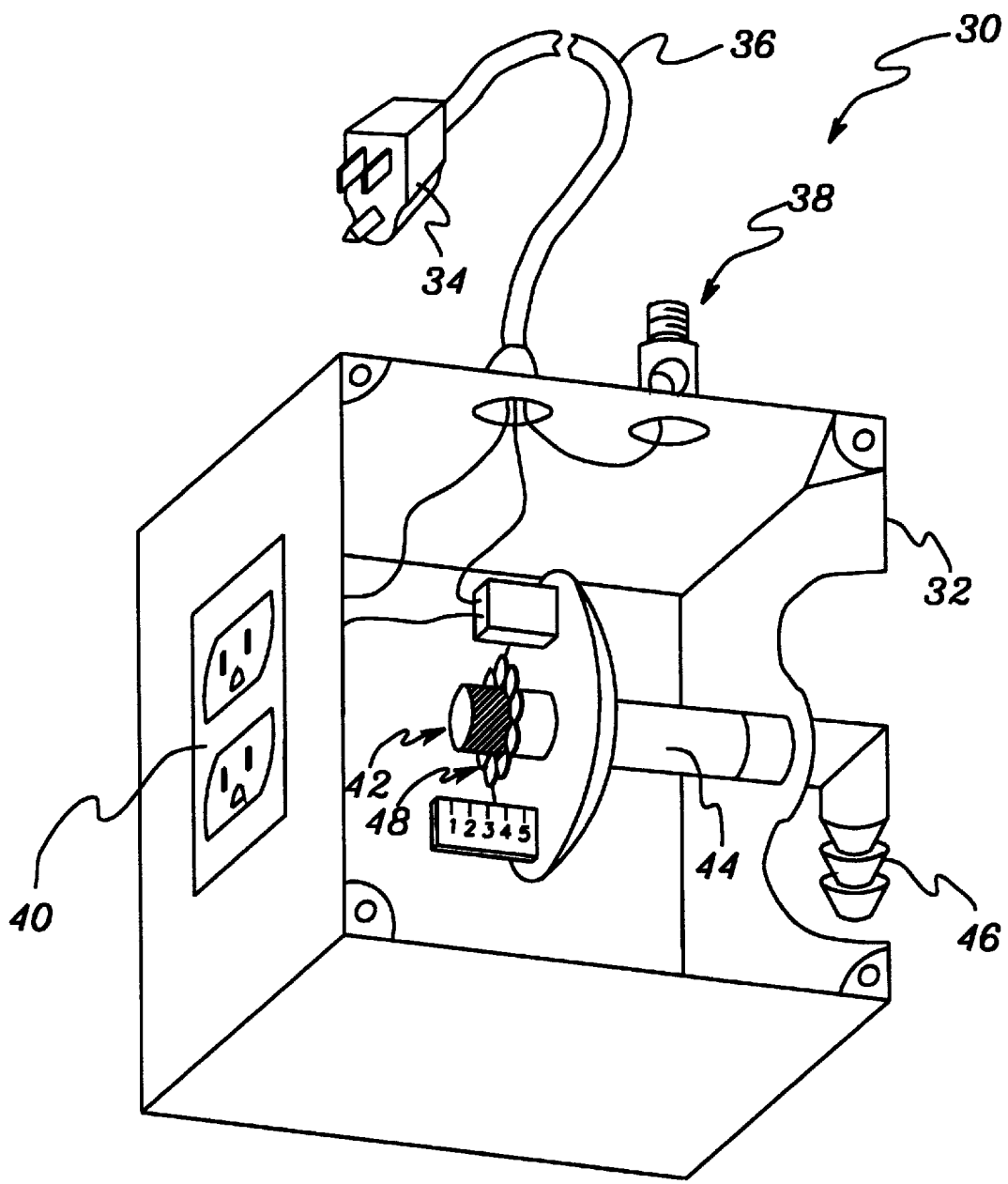
FIG. 3 depicts a perspective and partial cut-away view of a specific embodiment of the invention in a controller module for a chemical regulation system of a swimming pool water circulation system.

The invention may be embodied in a control module 30 as depicted in FIG. 3. The control module may comprise a housing 32 which may be provided with a detachable cover (not shown). The control module may be provided with a standard three prong power input coupling 34 for coupling to a standard three prong electrical outlet. The power input coupling may extend on a cable 36 originating from within the housing. The housing may be grounded and provided with a ground terminal 38.

The control module may further comprise a standard three prong power output coupling 40 to which the plug of a typical chemical pump may be coupled to provide power to the chemical pump. The power output coupling is preferably ground faulted so as to provide the capability of interrupting power when used with a non-ground faulted power source. Power may be supplied to the output power coupling under the control of a pressure responsive diaphragm switch 42. The switch 42 may include an inlet 44 which extends through the housing 32 and is coupled to a standard fitting 46 having a toothed tube coupling. While many types of fitting may be employed, it is preferable to provide a fitting which is angled to extend toward the part of the circulation system to which the control module will be coupled, thereby avoiding the possibility of kinking a coupling tube during operation. The switch 42 may further include a rotary calibration wheel 48 for setting the pressure threshold at which the state of the switch changes. The switch may be of the "normally open" type, such that a pressure input to the inlet which is above the threshold set by the calibration wheel will "close" the switch and thereby complete the circuit between the power input coupling and the power output coupling.

The invention is further embodied in a method for providing a control system for a chemical regulation system of a swimming pool water circulation system. The method involves providing a controller which is coupleable to the circulation system so as to be responsive to the pressure of water in the circulation system, and which is also coupleable to a chemical pump of the chemical regulation system so as to be determinative of the rate of output of the chemical pump as a function of the pressure of water in the circulation system. The controller is then coupled to the circulation system such that the controller will be responsive to the pressure of water in the circulation system when the controller is in an operative state, and to the chemical pump such that the controller is determinative of the rate of output of the chemical pump as a function of the pressure of water in the circulation system when the controller is in an operative state. The controller may be coupled to the circulation system by using a coupling means such as a vinyl tube to establish fluid communication between the controller and a portion of the circulation system. The controller may be determinative of the rate of output of the chemical pump in that it is capable of disabling the operation of the chemical pump when the pressure of water in the circulation system is less than a predetermined threshold. The controller may be made capable of disabling the operation of the chemical pump by providing the controller in the form of a pressure responsive switch and electrically coupling the switch between the chemical pump and a source of electrical power such that the controller interrupts the supply of power to the chemical pump when pressure in the circulation system falls below a given threshold.

The invention is further embodied in a method for providing a system for regulating the composition of swimming pool water. The method involves assembling a pump, a filter, an intake line and a return line so as to provide a circulation system for drawing water from a swimming pool, filtering the water, and returning the water to the swimming pool. These components and methods for their assembly will be known to those of ordinary skill in the art. A chemical pump is then coupled to the circulation system such that the chemical pump will be capable of pumping a chemical into the circulation system when the pump is in an operative state. Chemical pumps and methods for coupling them to swimming pool water circulation systems will also be known to those of ordinary skill in the art. A reservoir may be provided for holding chemicals to be pumped by the chemical pump.

A controller is then provided which is coupleable to the circulation system so as to be responsive to the pressure of water in the circulation system, and which is also coupleable to the chemical pump so as to be determinative of the rate of output of the chemical pump as a function of the pressure of water in the circulation system when the controller is in an operative state. The controller is then coupled to the circulation system such that the controller will be responsive to the pressure of water in the circulation system when the controller is in an operative state, and to the chemical pump such that the controller is determinative of the rate of output of the chemical pump as a function of the pressure of water in the circulation system when the controller is in an operative state. The controller may be coupled to the circulation system by using a coupling means such as a vinyl tube to establish fluid communication between the controller and a portion of the circulation system. The controller may be determinative of the rate of output of the chemical pump in that it is capable of disabling the operation of the chemical pump when the pressure of water in the circulation system is less than a predetermined threshold. The controller may be made capable of disabling the operation of the chemical pump by providing the controller in the form of a pressure responsive switch and electrically coupling the switch between the chemical pump and a source of electrical power such that the controller interrupts the supply of power to the chemical pump when pressure in the circulation system falls below a given threshold. The method may further involve coupling one or more additional chemical pumps to the controller.

The invention may be further embodied in a method for operating a chemical regulation system of a swimming pool water circulation system. The method involves determining that the pressure of water in the circulation system of the swimming pool is below a predetermined threshold, and then, based on that determination, preventing the injection of a water conditioning chemical into the water of the swimming pool. The determination that water pressure has fallen below a threshold may be made through continuous monitoring of the pressure in the circulation system using a pressure responsive controller which is coupled to be operative of a chemical injection pump of the chemical regulation system. Such a controller may comprise a pressure responsive switch. Preventing the injection of a water conditioning chemical into the water of the swimming pool may thus be accomplished by disabling the operation of a chemical injection pump of the chemical regulation system, for example by terminating the supply of electrical power to the chemical injection pump.

While the specific embodiments described above provide structures and methods which are best modes presently known to the inventors for carrying out the invention, the invention is capable of a variety of alternative embodiments. Those of ordinary skill in the art will be aware of other embodiments which may be employed without departing from the scope of the invention as defined in the following claims.

What is claimed is:

1. Safety control apparatus for coupling to an existing swimming pool water circulation system with a chemical supply system for supplying both a sanitizing solution and a pH balance solution, comprising:

a controller coupleable to the chemical supply system and the swimming pool water circulation system so as to turn off the chemical supply system when the pressure of water in the swimming pool water circulation system falls below a predetermined level, thereby preventing the supplying of sanitizing solution and pH balance solution;

means for sensing the pressure of water in the swimming Pool water circulation system, the means for sensing comprising a tube; and ground-faulted means for electronically coupling the controller to the chemical supply system, whereby the safety control apparatus reduces a risk of injury to swimmers from chemical build-up in the swimming pool water circulation system after a period of poor or no water circulation.

2. The control module of claim 1, wherein the chemical supply system comprises a chemical pump for each of the sanitizing solution and the pH balance solution, wherein the safety control apparatus further comprises a power input coupling for coupling the controller to a source of electrical power, and wherein the ground-faulted means comprises a power output coupling for providing power drawn through the power input coupling to the chemical pumps.

3. The control module of claim 1, wherein the chemical supply system comprises a first chemical pump for supplying the sanitizing solution and a second chemical pump for supplying the pH balance solution, the controller further comprising a pressure responsive switch electrically coupleable to the first chemical pump and the second chemical pump so as to control the supply of electrical power thereto through the ground-faulted means.

4. A method for coupling safety control apparatus to an existing swimming pool water circulation system and chemical supply system in order to reduce a possibility of chemical build-up in the swimming pool water circulation system after a period of poor or no water circulation, the chemical supply system for supplying both a sanitizing solution and a pH balanced solution, the method comprising steps of:

providing a controller which is coupleable to the existing swimming pool water circulation system and chemical supply system so as to turn off the existing chemical supply system when the pressure of water in the existing swimming pool water circulation system falls below a predetermined level, thereby preventing the supplying of the sanitizing solution and the pH balance solution;

coupling a pressure sensing means comprising a tube between the controller and the existing swimming pool water circulation system such that the controller will be responsive to the pressure of water in the existing swimming pool water circulation system as indicated by a level of water in the tube when the controller is in an operative state; and electrically coupling the controller to the chemical supply system such that the controller turns off the existing chemical supply system when the pressure of water in the existing swimming pool water circulation system falls below the predetermined level.

5. The method of claim 4, wherein the chemical supply system comprises a first chemical pump for supplying the sanitizing solution and a second chemical pump for supplying the pH balance solution to water in the swimming pool water circulation system, wherein the controller turns off the first chemical pump and the second chemical pump when the pressure of water in the swimming pool water circulation system is less than the predetermined level, and wherein the step of electrically coupling comprises electrically coupling the controller to the first chemical pump and the second chemical pump.

6. The method of claim 4, wherein the pressure sensing means further comprises a pressure responsive switch coupleable to the swimming pool water circulation system so as to be responsive to the pressure of water therein, the pressure responsive switch further being electrically coupleable for controlling the supply of electrical power to the chemical supply system, wherein the first step of coupling comprises coupling the pressure responsive switch to the tube, and wherein the step of electrically coupling comprises electrically coupling the pressure responsive switch to the chemical supply system.

7. The control module of claim 1, wherein the swimming pool water circulation system includes a filter, a pump coupled to the filter for pumping water therethrough, an intake line for drawing water from a swimming pool to the pump, and a return line for returning water from the filter to the swimming pool, wherein the chemical supply system includes a first chemical pump and a second chemical pump coupled to the return line for supplying the sanitizing solution and the pH balance solution, respectively, to the swimming pool water through the return line, and wherein the controller is coupleable to the return line and to the first chemical pump and the second chemical pump so as to turn off the first chemical pump and the second chemical pump when the pressure of water in the return line falls below the predetermined level.

\* \* \* \* \*